US 7,120,445 B2

(12) United States Patent
DeMarco et al.

(10) Patent No.: US 7,120,445 B2
(45) Date of Patent: Oct. 10, 2006

(54) SYSTEM FOR PREDICTIVELY AND DYNAMICALLY ALLOCATING COMMUNICATION BANDWIDTH

(75) Inventors: Stephen J. DeMarco, Binghamton, NY (US); Robert J. Szczerba, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 282 days.

(21) Appl. No.: 10/799,562

(22) Filed: Mar. 11, 2004

(65) Prior Publication Data
US 2005/0202827 A1   Sep. 15, 2005

(51) Int. Cl.
*H04Q 7/20* (2006.01)
(52) U.S. Cl. .................... 455/452.2; 455/450
(58) Field of Classification Search ......... 455/452.1–2, 455/453, 509, 456.1, 452.2, 464, 450; 370/252, 370/443
See application file for complete search history.

(56) References Cited

U.S. PATENT DOCUMENTS

| | | | |
|---|---|---|---|
| 5,943,316 A | 8/1999 | Davis | |
| 6,388,999 B1 | 5/2002 | Gorsuch et al. | |
| 6,542,481 B1 | 4/2003 | Foore et al. | |
| 6,621,805 B1 * | 9/2003 | Kondylis et al. | 370/329 |
| 6,842,428 B1 * | 1/2005 | Chen et al. | 370/252 |
| 6,850,764 B1 * | 2/2005 | Patel | 455/450 |
| 6,876,857 B1 * | 4/2005 | Nee et al. | 455/450 |
| 2001/0039582 A1 | 11/2001 | McKinnon et al. | |
| 2002/0093983 A1 | 7/2002 | Newberg et al. | |
| 2003/0061351 A1 | 3/2003 | Prathima et al. | |
| 2003/0072289 A1 | 4/2003 | Yuang et al. | |

OTHER PUBLICATIONS

"Communications Networks for the Force XXI Digitized Battlefield"—Paul Sass Mobile Networks and Applications Oct. 1999 vol. 4 Issue 3, pp. 139-155.

"Mobility Management for Hierarchical Wireless Networks"—Guangyu Pei, Mario Gerla Mobile Networks and Applications Aug. 2001, vol. 6, Issue 4, pp. 331-337.

"On-Demand Multicast Routing Protocol in Multihop Wireless Mobile Networks" Sung Ju Lee, William Su, Mario Gerla—Mobile Networks and Applications, Dec. 2002, vol. 7, Issue 6, pp. 441-453.

"Network Simulation: Experiences Applying Parallel and Interoperable Network Simulation Techniques in On-Line Simulations of Military Networks"—Kalyan Perumalla, Richard Fujimoto, Thom McLean, George Riley—Proceedings of the Sixteenth Workshop on Parallel and Distributed Simulation, May 2002, pp. 97-104.

"Intelligent Information Dissemination Services in Hybrid Satellite-Wireless Networks" Eddie C. Shek, Son K. Dao, Yongguang Zhang, Darrel J. Van Buer, Giovanni Giuffrida, Mobile Networks and Applications, Dec. 2000, vol. 5, Issue 4, pp. 273-284.

* cited by examiner

Primary Examiner—CongVan Tran
(74) Attorney, Agent, or Firm—Tarolli, Sundheim, Covell & Tummino LLP

(57) ABSTRACT

A system predictively allocates bandwidth within a wireless network in accordance with a mission plan. The system includes a first team member and a second team member. The first team member predicts subsequent communication demand by the second team member in accordance with the mission plan. The second team member predicts subsequent communication demand by the first team member in accordance with the mission plan. The first team member is allocated a bandwidth commensurate with a predicted need of the first team member and a predicted need of the second team member. The second team member being allocated a bandwidth commensurate with a predicted need of the first team member and the second team member.

20 Claims, 3 Drawing Sheets

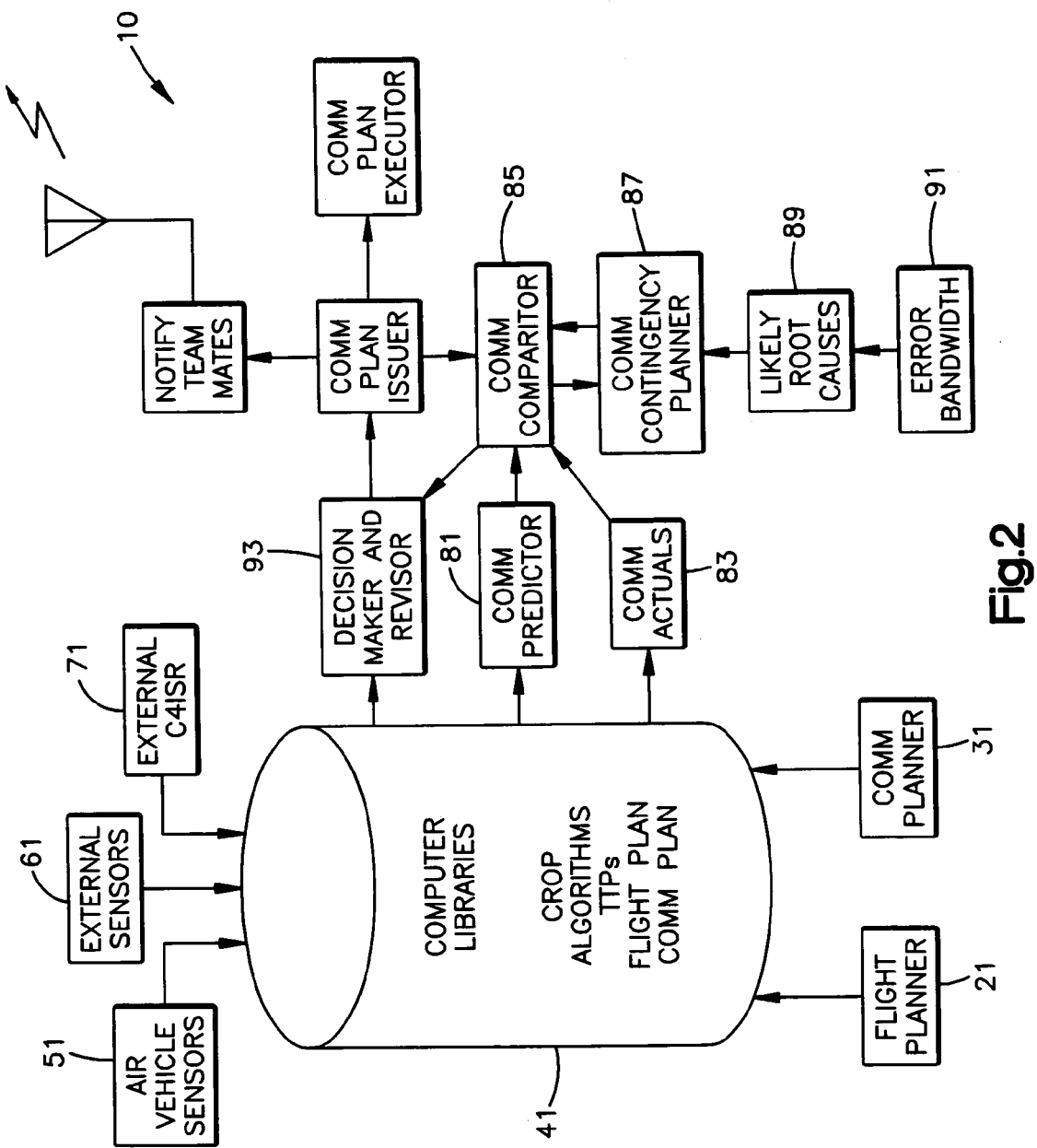
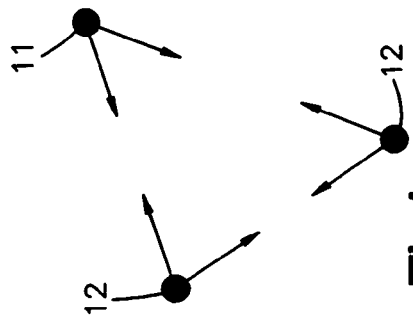

SYSTEM FOR PREDICTIVELY AND DYNAMICALLY ALLOCATING COMMUNICATION BANDWIDTH

FIELD OF INVENTION

The present invention relates to a system for allocating bandwidth within a network, and more specifically, to a system for predictively and dynamically allocating communication bandwidth within a wireless network.

BACKGROUND OF THE INVENTION

Conventional Unmanned Aerial Vehicles (UAVs) operate in various environments and terrains. Future UAV teams are envisioned to be highly autonomous, not requiring constant attention from a control base station. These autonomous UAV teams will likely communicate over a radio frequency link with the control base station. If several autonomous UAVs are operating as part of a team, these UAV team members will likely communicate with each other over a communication network as well. These UAV members will likely be required to inform each other of their respective and absolute positions and flight plans so that they don't hit each other and, since these UAV members are operating autonomously, to continually adjust flight plans to react to the environment, the terrain, and to enemy threats. Each UAV member in the team would communicate periodically with other members of the team.

Members of such a team of UAVs would share the limited network data rate capacity with each other, with other teams of UAVs, and with other elements of the battle space. As a mission unfolds, the changing battle and consequent communication needs of each element of the force may change. The individual demands upon the communications network aggregate and may use up all of the available data rates such that the next separate demand would go unfulfilled in the immediate time scale.

When a UAV team enters a battle area, its communication demands may increase as the members collaboratively plan target engagements and flight plans. The members may simultaneously transmit and receive target tracks and flight plans that may rapidly change. The UAV members of such a team further may conduct collaborative sensing and targeting and update common relevant operational pictures (CROPs), C4ISR information, command and control information, etc. Additional demands may also be placed on the team by non-UAV elements of the battle space.

All of these simultaneous communication demands of the team place stress on the communication network of the team by using up the available data rate, or bandwidth. However, a network typically has "quality of service" algorithms to react and reallocate network resources to those UAV members using it the most. When this happens, some of the UAV members will experience increased delays in their message deliveries, lost packets of information, and other types of service degradation.

For example, assume that each UAV member needs a communications channel with a data rate of 2,000 kilobits per second (kbps) to transmit a 500 kilobit image file in 250 milliseconds (500/2,000). Typically, three images will be sent in succession and this would take about 750 milliseconds. Add another 250 millisesconds for various intermediary processing tasks and the entire process of transmitting and receiving the three images may take 1,000 milliseconds, or 1 second. Thus, the communications channel is entirely consumed by the transmission of these three images for 1 second. Enlarge this concept to a team of five UAV members sharing a communications network with a maximum simultaneous capacity of 10,000 kilobits per second. This communications network would be able to support the transmission of five simultaneous three-image sets of files from these UAV members to a base station. In "non-stressful" situations, this example communication network's underlying data rate is sufficient to support all five UAV members.

However, typically other conditions may restrict the available data rate. Environmental conditions such as rain may reduce the data rate. Enemy jamming may reduce the data rate. Other friendly forces may consume the data rate of the same communications network.

Assume these situations occur and the actual data rate available to the UAV team is only 5,000 kilobits per second. The communications network would then handle only two sets of three image files simultaneously. The network protocols would function in a reactive manner to reallocate the data rates to the earliest transmitted files, not necessarily the two most critical transmitted files. Assume that this takes 250 milliseconds.

Consequently, there would be an additional 250 millisecond delay before the communications network reallocates the available data rates. Furthermore, a third, presumed less critical, set of images would still be delayed with that third set possibly being the most critical set.

Such a conventional system is reactive in nature. Services are reallocated subsequent to the overload occurring within the network. At best, there may be a temporary "bubble" of overload before the qualities of service algorithms begin working. Sometimes a UAV using the most available data rate may not be the UAV with the highest priority, or critical mission need. At worst, the degradation of communications may persist for a period that may degrade critical mission effectiveness.

SUMMARY OF THE INVENTION

A system in accordance with the present invention predictively allocates bandwidth within a wireless network in accordance with a mission plan. The system includes a first team member and a second team member. The first team member predicts subsequent communication demand by the second team member in accordance with the mission plan. The second team member predicts subsequent communication demand by the first team member in accordance with the mission plan. The first team member is allocated a bandwidth commensurate with a predicted need of the first team member and a predicted need of the second team member. The second team member being allocated a bandwidth commensurate with a predicted need of the first team member and the second team member.

A computer program product in accordance with the present invention predictively allocates bandwidth within a network in accordance with a mission plan. The computer program product includes a first instruction for predicting subsequent communication demand by a first team member in accordance with the mission plan, a second instruction for predicting subsequent communication demand by a second team member in accordance with the mission plan, a third instruction for allocating a first bandwidth commensurate with a predicted need of the first team member and a predicted need of the second team member, and a fourth instruction for allocating a second bandwidth commensurate with a predicted need of the first team member and the second team member.

A method in accordance with the present invention predictively allocates bandwidth within a network in accordance with a mission plan. The method includes the steps of: predicting subsequent communication demand by a first team member in accordance with the mission plan; predicting subsequent communication demand by a second team member in accordance with the mission plan; allocating a first bandwidth commensurate with a predicted need of the first team member and a predicted need of the second team member; and allocating a second bandwidth commensurate with a predicted need of the first team member and the second team member. The sum of the first bandwidth and the second bandwidth are less than or equal to an available amount of bandwidth.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic representation of an example system for use with the present invention;

FIG. 2 is a schematic representation of an example system in accordance with the present invention;

DESCRIPTION OF AN EXAMPLE EMBODIMENT

Figure 3:
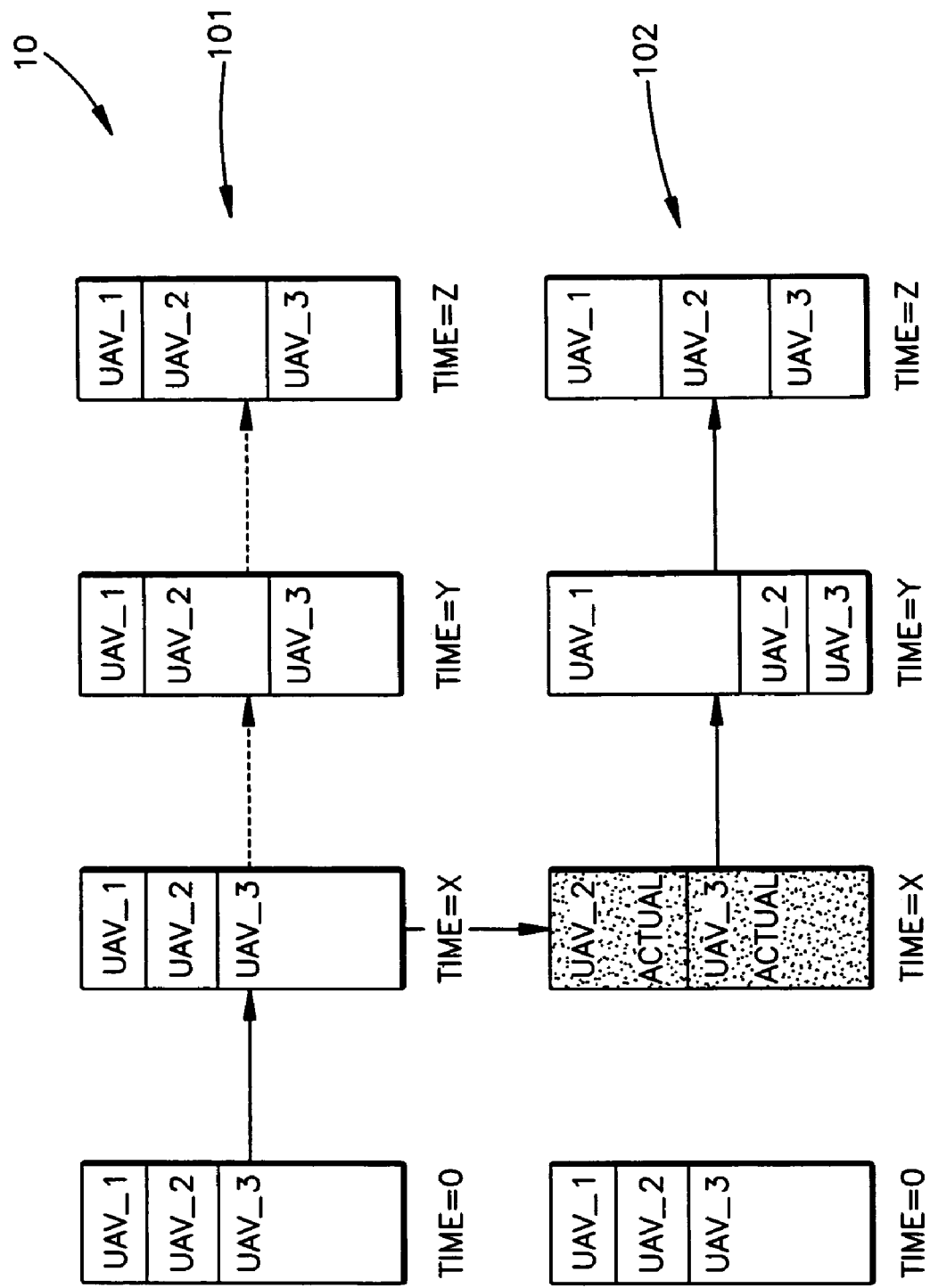
FIG. 3 is a schematic representation of an example operation of a system in accordance with the present invention.

A system 10 in accordance with the present invention predicts communication demands upon a network so that entities requiring the most bandwidth (and the highest critical mission priority) are allocated that bandwidth, thus reducing the "bubble" of overload and enhancing mission effectiveness. Specifically, the system 10 predicts upcoming communications demands upon a wireless network so that Unmanned Aerial Vehicles (UAVs) requiring the most network bandwidth are allocated that bandwidth in a pre-allocated and deterministic manner.

A team of UAVs may have individual members that each share a common knowledge of initial mission and flight plans, a common set of deterministic algorithms for developing flight plans, autonomous flight, collaboration, contingency management, etc., a common relevant operational picture (CROP), an identical set of algorithms to select a technique, tactic, or procedure (TTP) in response to a threat and/or contingency, and/or an encryption means, or security apparatus, such as a random number generator with each teammate initially knowing a sequence of random seeds. When a mission is originally planned for each of the UAV members, computer libraries containing TTPs are loaded with an identical set of deterministic algorithms so that each individual member of the UAV team is fully prepared to react deterministically to a common set of threats and/or contingencies.

Each UAV member therefore may react identically given the identical set of circumstances. Additionally, if each UAV member has an identical CROP, or receives the same CROP updates, an individual UAV member may be able to accurately predict the actions of the other UAV members. The set of TTPs and consequent reactions may be robust enough to handle a certain range of deviation from an expected and deterministic set of threats and contingencies.

The system 10 may utilize algorithms so that each UAV member of the team continuously predicts the actions and reactions of each of the other UAV members. Some minor amount of deviation may be expected and included in the algorithms to account for small and insignificant variations, within a predetermined threshold.

The system 10 may further utilize algorithms so that each UAV member of the team may compare its prediction of each of the other UAV members and identify whether any UAV member deviates from that prediction. These algorithms may include the capability to identify whether a deviation is minor or the result of a change in the TTPs of a UAV member. If the algorithms determine that the change was due to a change in the TTPs, the algorithms may develop a "best" estimation of the root cause of the change. For example, a pop-up, or unexpected, threat may cause a UAV member to immediately deviate from its planned flight and take evasive action. The algorithm may be able to predict those root causes that would cause the diverting UAV member to take that kind of unexpected and unplanned evasive action.

Consequently, the UAV team's actions and reactions are completely predictable to the team, within certain deterministic limits. This predictability may also allow enemy forces to predict these actions as well. Since the TTP algorithms are deterministic in nature, the algorithms may produce the same results with identical input.

The system 10 may advantageously cause this identical input to appear predictable to friendly forces and unpredictable to enemy forces through use of a random number generator. The random number generator provides the initial inputs to the algorithms. Since random number generators are based on an initial "random seed", UAV members may have the same random seed, and random numbers generated may be identical for each UAV member. Random numbers entered into the deterministic algorithms will appear unpredictable to enemy forces, yet be predictable to the friendly forces that know the initial random seed.

The communication demands of individual UAV members in the team may change over time, but also be predictable in nature. For example, Emissions Control (EMCON), but not normal communications may occur at any time. Only emergency communications may be permitted during this time. An emergency communication may be a transmission of an identification of a threat and the threat's track. Another emergency communication may be a request for weapons release. Another emergency communication may be a battlefield damage assessment (BDA) including the transmission of several images.

Normal communication may include the transmission of each UAV member's location, flight path, payload status, health status, and sharing of CROP updates received from the C4ISR network. These communications are deterministic and their transmission is generally predictable.

Depending on the mission specifics, an algorithm in accordance with the system 10 may be used that predicts the transmission requirements of each member of the UAV team and automatically allots extra data-rate from the limited supply of the communication network. This allocation may be done in advance of need because the need may be predicted. This predictability may alleviate delays of conventional data-rate allocation algorithms and provide great mission effectiveness. Also, the prediction of need may be done in advance of the communication need in real time (i.e., in-flight, etc.).

FIG. 2 illustrates an example flowchart of how the system 10 implements the individual pieces in response to an example realistic scenario. This scenario may have two UAVs flying as a team on an example mission. During part of the example mission, the UAVs may fly low, close to the ground, to maintain a low profile and thereby be undetectable. The UAVs may reach a hill and each UAV may fly to either side of the hill for a few minutes. At this time, the UAVs may be out of direct communications with each other.

The two UAVs may plan to meet at a rendezvous point on the other side of the hill, send a brief message to each other identifying themselves as "friendly", and then continue the example mission. However, one of the UAVs may be unexpectedly delayed.

The Flight Planner 21 and the COMM Planner 31 may provide the basis of the overall example plan residing within the on-board Computer Libraries 41 on each UAV. The libraries may include a Common Relevant Operating Picture (CROP), a Digital 3-D terrain map, a geo-location of known "friendlies" and "threats", algorithms shared among the UAVs on the example mission, and/or a random seed used within the algorithms. The libraries may further include TTPs, stored reactions to encountered events, stored reactions to unexpected contingencies, flight plan waypoints for each UAV while traversing through the digital 3-d terrain map, a random seed used within the flight planner 21, and/or a COMM Plan (a random seed used in the COMM planner 31). The libraries may still further include a center frequency (MegaHz) for each data-link to use at each waypoint in the example mission, a data rate (i.e., a communications bandwidth, etc.) of transmission (KiloBytes/second) for each data-link to use at each waypoint in the example mission, a schema for message priorities, a schema for assignment of message type to individual data-links, and/or back-up and contingency plans. Air Vehicle Sensors 51, External Sensors 61, and External C4ISR 71 may continually update the CROP in the Computer Libraries 41 as the example mission progresses.

A deviation from the expected flight plan may be a key event that triggers a predictive allocation of communication bandwidth in accordance with the present invention. This may occur during the course of a mission when a first UAV expects a second UAV to be within sight subsequent to flying behind a hill. At that time, time (x), the first UAV would have planned to have its air vehicle sensors detecting and identifying the second UAV. The second UAV may also transmit an "Identify Friend" (IF) or "Identify Foe" (IFF) message to identify itself. IF and IFF are very short messages transmitted on the IFF channel. The example mission may continue.

However, if the second UAV is not detected within a certain delay time (y), the continuation of the example mission may be threatened. A COMM Predictor 81 may have predicted that an IFF message has been received at time (x). The COMM Predictor 81 and a COMM Actuals 83 may both feed a COMM Comparator 85. The COMM Actuals 83 may show that no IFF message has been received while the COMM Predictor 81 shows that the IFF message was to be received. The COMM Comparator 85 may sense the discrepancy and call a COMM Contingency Planner 87 that may determine Likely Root Causes 89 and Error Bandwidth 91. The system 10 may then determine whether the delay is serious and predict a most likely cause.

If the delay is excessive, the most likely cause may be either the second UAV has encountered an unexpected threat that resulted in the termination of the second UAV or the second UAV has successively responded to a threat. Also, the second UAV may have thoroughly scanned the threat area and identified a threat to be a higher priority target than an originally planned mission target.

The COMM Comparator 85 may notify a Decision Maker and Revisor 93. The Decision Maker and Revisor 93 may execute an emergency communication plan. An example emergency communication plan may be that the first UAV remain in a planned meeting area and allocate all of its bandwidth on a high priority, high data rate communication channel locating the second UAV and any critical update. The identity of a new high priority target may be a critical update of interest. If the emergency communication plan has not been activated, the first UAV may normally have continued to reserve only a part of the high data rate communication channel to locating the second UAV.

The second UAV may receive a rendezvous point, but have already initiated an emergency communication plan to allocate all bandwidth on the high priority, high data rate communication channel. When both UAVs are within communication range, both UAVs may utilize this reserved communication channel for quickly updating the first UAV with the information regarding the new, higher priority threat.

This example predictive allocation of communication bandwidth of the system 10 thus enables both UAVs to successfully react to unexpected contingencies. Other example scenarios with additional ground station 11 and/or UAVs 12 may be envisioned that would demonstrate how this predictive allocation of bandwidth may enhance mission effectiveness (FIG. 1).

FIG. 3 shows an example of a timeline of an original COMM plan 101 at time equals zero and at three subsequent time increments X, Y, and Z. At time equal to X, actual communication usage deviates from the plan and the system 10 may utilize a new algorithm 102 to immediately replan the communication bandwidth allocations for time increments Y and Z. The new algorithm may, for example, determine the root cause to be that UAV_1 lost line of sight communication at time=X. Consequently, the replanned communication plan may provide more bandwidth for UAV_1 with the expectation that UAV_1 will need to communicate much data as soon as UAV_1 regains line of sight.

As another example, assume that a UAV team consists of 2 UAV members searching a 10 km by 20 km area. Each UAV member traverses to a position where that UAV member may search a 1 km by 1 km area within 5 seconds. During traverse time, the 2 UAV members communicate with each other to coordinate their search patterns.

After the traverse time, each UAV member may take several seconds to search the 1 km by 1 km area and an additional two seconds to perform automatic target recognition. If a target is detected by a UAV member, that UAV member immediately transmits data about the target to a battlespace management system external to the UAVs. If no target is detected, that UAV member transmits such a negative result to the other UAV member, and then begins traversing to its next search quadrant.

Consequently, each UAV member may reasonably predict the communication needs of its teammate, the other UAV member. During the traverse period, a UAV member may communicate with the other UAV member to coordinate each of their search patterns. During a search time, there is little communication. When a search is completed, either by the detection of a target or by a negative result, there is communication.

Each UAV member, during the search of the 10 km by 20 km area, may predict the communication need of its teammate UAV member, and coordinate that UAV member's need with its own communication need. The UAV member may predict that, during the traverse and completion of a search, the other UAV member may need to communicate.

Logically, the UAV team may allot more communication data rate to a UAV member that is at the end of a search pattern. This allocation may be coordinated by the UAV team members and protected from enemy interception and/or jamming by the random seed algorithm. Thus, a system 10 in accordance with the present invention may predict upcoming communication demands upon a wireless network so that entities requiring more network bandwidth may receive it in a pre-allocated and deterministic manner, thus reducing the "bubble" of overload and enhancing mission effectiveness.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multiprocessor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

Figure 4:
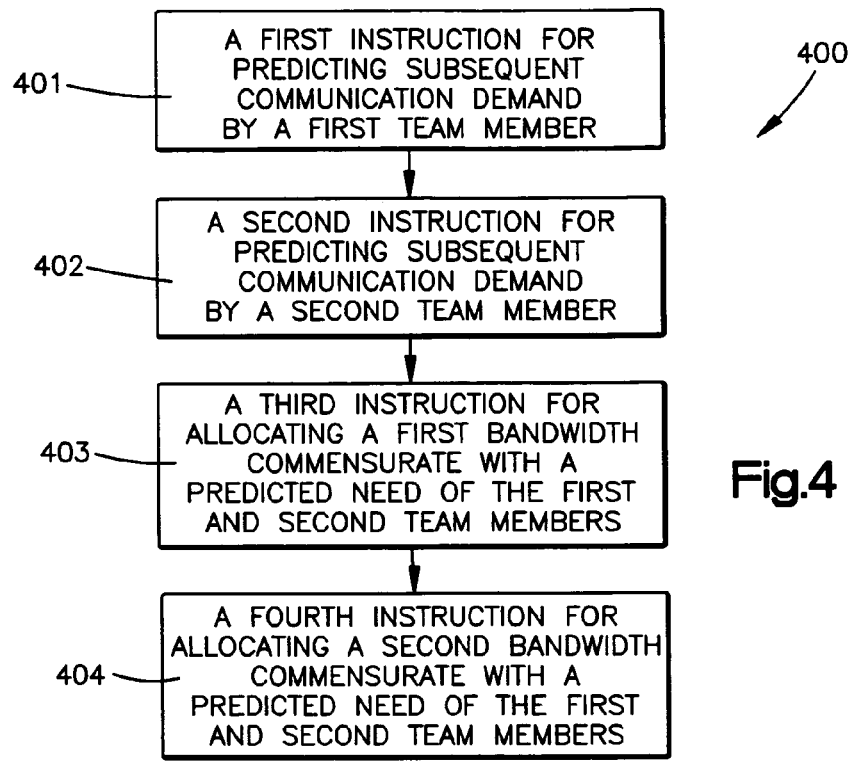
FIG. 4 is schematic representation of another example system in accordance with the present invention.

An example computer program product 400 in accordance with the present invention predictively allocates bandwidth within a network (FIG. 4). The computer program product 400 includes a first instruction 401 for predicting subsequent communication demand by a first team member, a second instruction 402 for predicting subsequent communication demand by a second team member, a third instruction 403 for allocating a first bandwidth commensurate with a predicted need of the first team member and a predicted need of the second team member, and a fourth instruction 404 for allocating a second bandwidth commensurate with a predicted need of the first team member and the second team member.

Figure 5:
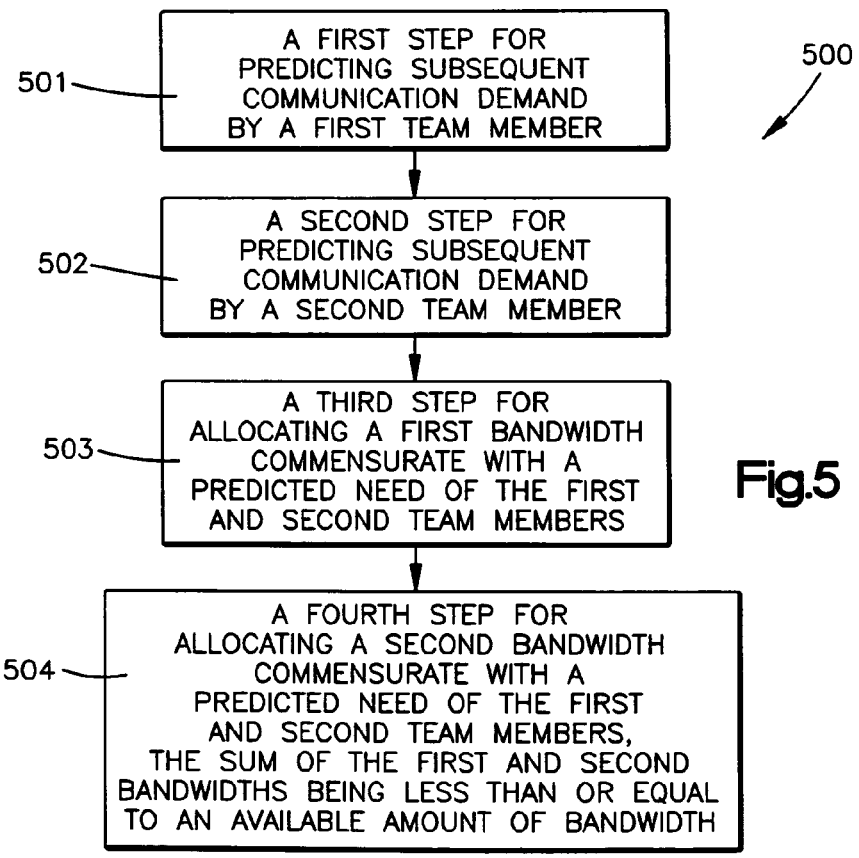
FIG. 5 is a schematic representation of still another example system in accordance with the present invention.

An example method 500 in accordance with the present invention predictively allocates bandwidth within a network (FIG. 5). The method 500 includes the steps of: predicting 501 subsequent communication demand by a first team member; predicting 502 subsequent communication demand by a second team member; allocating 503 a first bandwidth commensurate with a predicted need of the first team member and a predicted need of the second team member; and allocating 504 a second bandwidth commensurate with a predicted need of the first team member and the second team member. The sum of the first bandwidth and the second bandwidth are less than or equal to an available amount of bandwidth.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A system for predictively allocating bandwidth within a wireless network in accordance with a mission plan, said system comprising:
   a first team member; and
   a second team member,
   said first team member predicting subsequent communication demand by said second team member in accordance with the mission plan, said second team member predicting subsequent communication demand by said first team member in accordance with the mission plan,
   said first team member being allocated a bandwidth commensurate with a predicted need of said first team member and a predicted need of said second team member, said second team member being allocated a bandwidth commensurate with a predicted need of said first team member and said second team member.

2. The system as set forth in claim 1 wherein said first team member and said second team member share a common knowledge of an initial mission plan.

3. The system as set forth in claim 1 further including an encryption means for providing initial inputs to both said first team member and said second team member.

4. The system as set forth in claim 1 further including a random seed for input into a first random number generator of said first team member.

5. The system as set forth in claim 4 wherein said random seed is input into a second random number generator of said second team member.

6. The system as set forth in claim 5 wherein said random seed produces identical outputs by both said first random number generator and said second random number generator.

7. The system as set forth in claim 1 further including an initial algorithm for allocating subsequent communication usage.

8. The system as set forth in claim 7 further including a new algorithm for allocating subsequent communication usage, implementation of said new algorithm being caused by deviation of actual communication usage from said initial algorithm.

9. The system as set forth in claim 1 wherein said first team member continuously predicts actions and reactions of said second team member.

10. The system as set forth in claim 1 wherein said first team member communicates with said second team member to determine the accuracy of predictions of said first team member.

11. A computer program product for predictively allocating bandwidth within a network in accordance with a mission plan, said computer program product comprising:
    a first instruction for predicting subsequent communication demand by a first team member in accordance with the mission plan;
    a second instruction for predicting subsequent communication demand by a second team member in accordance with the mission plan;
    a third instruction for allocating a first bandwidth commensurate with a predicted need of the first team member and a predicted need of the second team member; and
    a fourth instruction for allocating a second bandwidth commensurate with a predicted need of the first team member and the second team member.

12. The computer program product as set forth in claim 11 further including a fifth instruction for inputting an initial mission plan to both the first team member and the second team member.

13. The computer program product as set forth in claim 11 further including a fifth instruction for encrypting communication by providing initial inputs to both the first team member and the second team member by a random number generator.

14. The computer program product as set forth in claim 11 further including a fifth instruction for inputting a random seed into a first security apparatus of the first team member.

15. The computer program product as set forth in claim 14 further including a sixth instruction for inputting the random seed into a second security apparatus of the second team member.

16. A method for predictively allocating bandwidth within a network in accordance with a mission plan, said method comprising the steps of:
    predicting subsequent communication demand by a first team member in accordance with the mission plan;
    predicting subsequent communication demand by a second team member in accordance with the mission plan;

allocating a first bandwidth commensurate with a predicted need of the first team member and a predicted need of the second team member; and allocating a second bandwidth commensurate with a predicted need of the first team member and the second team member, the sum of the first bandwidth and the second bandwidth being less than or equal to an available amount of bandwidth.

17. The method as set forth in claim 16 further including the step of producing identical outputs by a first random number generator of the first team member and a second random number generator of the second team member.

18. The method as set forth in claim 16 further including the step of allocating subsequent communication usage of the first and second team members by an initial algorithm.

19. The method as set forth in claim 18 further including the step of allocating subsequent communication usage of the first and second team members by a new algorithm, implementation of the new algorithm being caused by deviation of actual communication usage from the initial algorithm.

20. The method as set forth in claim 16 further including the step of continuously predicting actions and reactions of the second team member by the first team member, the first team member communicating with the second team member to determine the accuracy of predictions of the first team member.

* * * * *